Patented Apr. 14, 1931

1,800,435

UNITED STATES PATENT OFFICE

LUDWIG J. CHRISTMANN, OF JERSEY CITY, NEW JERSEY, ASSIGNOR TO AMERICAN CYANAMID COMPANY, OF NEW YORK, N. Y., A CORPORATION OF MAINE

ANTIOXIDANT

No Drawing.   Application filed August 21, 1928.   Serial No. 301,159.

This invention relates to compounds for retarding or preventing the oxidation of organic substances, and compositions containing the same. Such antioxidants have many uses in various industrial and commercial fields, such as for the preservation of oxidizable organic compounds and, more particularly, for arresting deterioration of rubber compositions.

I have discovered that a series of compounds, which may be classified as amino diphenyl derivatives or substituted benzidine compounds, have antioxidant properties which make them useful for the above purposes. The probable formula of this class of antioxidants may be written as

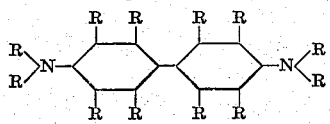

in which R represents hydrogen or alkyl groups, at least one R standing for an alkyl radical. It is understood that the term alkyl group or radical refers not only to a hydrocarbon residue containing carbon and hydrogen but is also meant to include a radical or group containing other elements in addition to those mentioned.

More specifically, among the compounds falling within this class may be mentioned o-dianisidine, o-tolidine, tetraethyl-benzidine, tetramethyl-benzidine, etc. All of these substances have been successfully used and have been found to retard or entirely prevent deterioration of organic compounds such as rubber, due to oxidation.

The antioxidants described may be prepared in any manner well known to the art, the following specific example of a method suitable for the preparation of tetramethyl-benzidine being given purely by way of illustration and not in limitation:

A mixture of 60 parts dimethyl aniline, 260 parts sulphuric acid (90%), and 2 parts turpentine, is heated for about four hours in an oil bath maintained at a temperature of 190–200° C. The reaction mixture is cooled by being poured on ice, and after cooling is neutralized with ammonia, filtered and the solids washed with water. The crude product remaining on the filter may then be recrystallized from toluol. By this method the yield of crude product is substantially quantitative.

To illustrate the effectiveness of this antioxidant, a standard vulcanizable rubber mixture was made up containing about 1%, by weight, of tetramethyl-benzidine. The mixture was then vulcanized at 288° F. for thirty minutes and cut up into test pieces. A break test was carried out on several test pieces and others of the test pieces were placed in an oxygen bomb which was maintained at 70° C. for three days under an oxygen pressure of 300 pounds. This test was devised to permit a rapid determination of the effect of oxygen upon the rubber, the results corresponding approximately to what might be expected to take place in a much greater period of time in ordinary use of the rubber composition. The following table illustrates the effect of the presence of the small amount of antioxidant:

|  | Tension at break lbs. sq. in. | |
| --- | --- | --- |
|  | Before aging | After aging |
| Rubber compound with 1% tetramethyl-benzidine | 2870 | 2380 |

A similar rubber composition made up and vulcanized under the same conditions, but containing no antioxidant, was found to deteriorate completely after the same accelerated oxidation test.

It is obvious that many other substances falling within the general classification described, may be used as antioxidants with similar effects to those described. Any suitable and desired changes may be made in proportions, compounds used and other conditions of operation without departing from the spirit and scope of the invention, except as set forth in the appended claims.

I claim:

1. A rubber composition containing a tetra alkyl substituted benzidine.

2. A rubber composition containing tetramethyl benzidine.

3. The process of retarding oxidation of an oxidizable organic compound which comprises mixing therewith a tetra alkyl substituted benzidine.

4. The process of retarding oxidation of an oxidizable organic compound which comprises mixing therewith tetramethyl benzidine.

5. The process of retarding oxidation of a rubber composition which comprises mixing a tetra alkyl substituted benzidine therewith.

6. The process of retarding oxidation of a rubber composition which comprises mixing tetramethyl benzidine therewith.

In testimony whereof, I have hereunto subscribed my name this 15 day of August, 1928.

LUDWIG J. CHRISTMANN.